(12) United States Patent
Takahashi et al.

(10) Patent No.: US 7,232,260 B2
(45) Date of Patent: Jun. 19, 2007

(54) OPTICAL CONTACT UNIT AND OPTICAL PLUG

(75) Inventors: Tetsuo Takahashi, Kanagawa (JP); Manabu Komatsubara, Kanagawa (JP)

(73) Assignee: Canare Electric Co., Ltd., Aichi-gun, Aichi-ken (JP)

( * ) Notice: Subject to any disclaimer, the term of this patent is extended or adjusted under 35 U.S.C. 154(b) by 69 days.

(21) Appl. No.: 11/105,463

(22) Filed: Apr. 14, 2005

(65) Prior Publication Data

US 2005/0232552 A1    Oct. 20, 2005

(30) Foreign Application Priority Data

Apr. 15, 2004   (JP) .............. 2004-120751

(51) Int. Cl.
*G02B 6/36*    (2006.01)
*G02B 6/38*    (2006.01)

(52) U.S. Cl. ................. 385/76; 385/78; 385/72; 385/81; 385/84

(58) Field of Classification Search ............. None
See application file for complete search history.

(56) References Cited

U.S. PATENT DOCUMENTS

| 4,687,288 A | 8/1987 | Margolin et al. |
| 4,747,658 A | 5/1988 | Borsuk et al. |
| 5,285,510 A | 2/1994 | Slaney |
| 5,396,572 A | 3/1995 | Bradley et al. |
| 5,862,282 A * | 1/1999 | Matsuura et al. ............. 385/86 |
| 5,915,057 A * | 6/1999 | Weigel ........................ 385/76 |

FOREIGN PATENT DOCUMENTS

GB    2 253 278 A    9/1992

OTHER PUBLICATIONS

European Search Report dated Jun. 28, 2005.

* cited by examiner

*Primary Examiner*—Rodney Bovernick
*Assistant Examiner*—Omar Rojas
(74) *Attorney, Agent, or Firm*—McGinn IP Law Group, PLLC

(57) ABSTRACT

A ferrule holder and a coil spring are provided in a main body formed in an approximately tube shape. A cable adaptor including a front opening part at a large diameter part is inserted from a back opening part into the main body having slits and. A first small diameter part of the main body fits with the large diameter part of the cable adaptor and prevents the cable adaptor from translating in the z-axis direction. And the second small diameter part of the main body controls transfer of the ferrule holder in the z-axis direction. At the forward part of the large diameter, a taper part which helps to insert the cable adaptor is formed around the circuit of the optical axis. Each slit formed at the back opening part also helps to insert the cable adaptor.

9 Claims, 12 Drawing Sheets

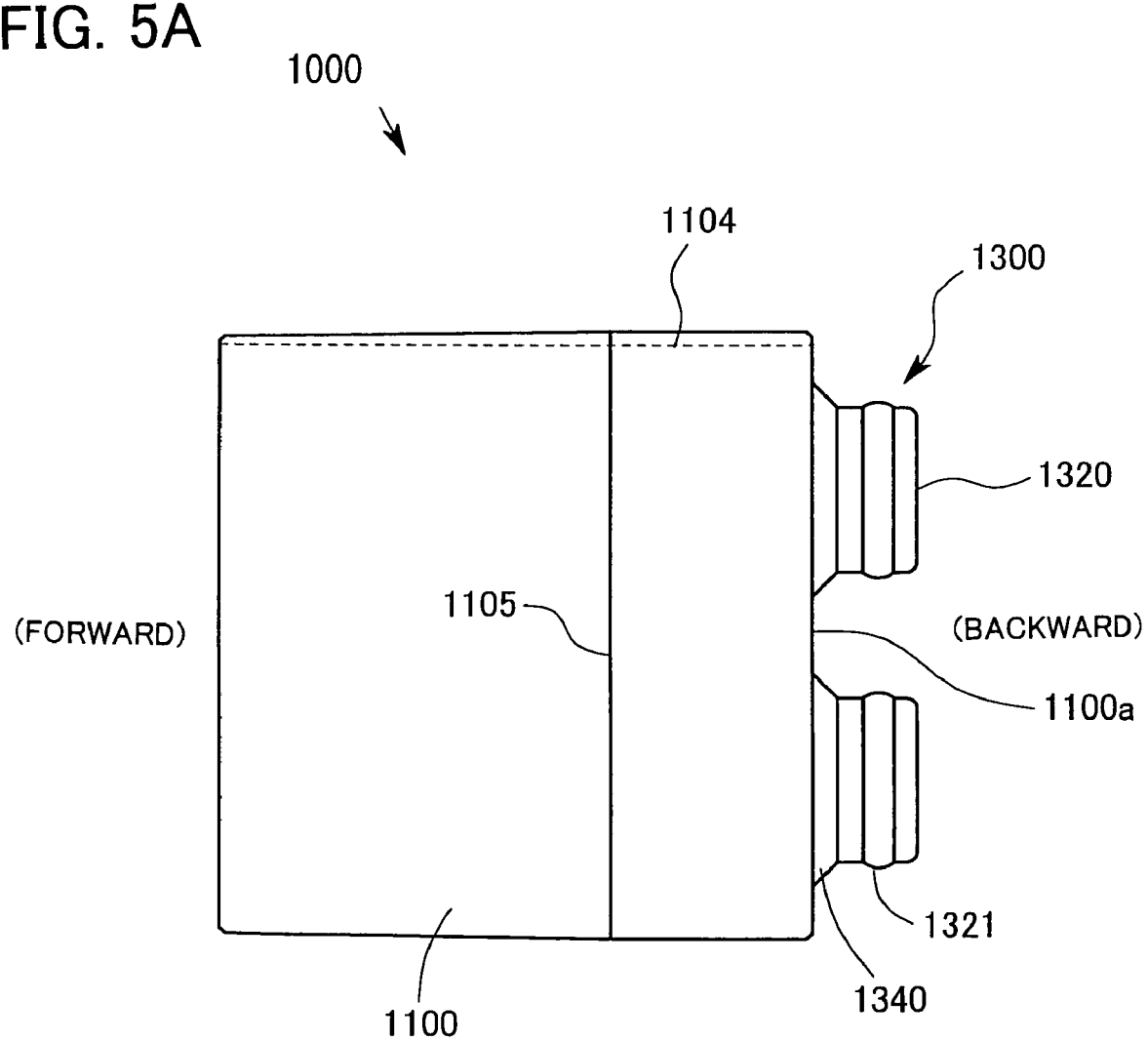

OPTICAL CONTACT UNIT AND OPTICAL PLUG

TECHNICAL FIELD

The present invention relates to an optical plug connecting optical fibers and mechanical structure of its contact. So the optical plug and the optical contact unit of the present invention are useful for a cable connector (coupler) comprising optical fibers.

BACKGROUND ART

Patent document 1, i.e., Japanese Patent Application Laid-open No. 2001-74977, illustrates a well-known, conventional mechanical structure of a contact that connects optical fibers. As disclosed in the patent document 1, problems persist in a conventional method for binding a male screw formed at a cable adaptor and a female screw formed at a tube shape body by screwing them together.

A conventional product in the patent document 1 is invented to solve this problem (referred to as a problem 1 0 hereinafter). As shown in the patent document 1, problems persist in the above-described junction structure because too much time and high technique are required to fabricate a machine such as a screw and because forming a smaller device tends to be prevented by introducing the screwing part.

DISCLOSURE OF THE INVENTION

Problems to be Solved

The conventional device disclosed in the patent document 1, however, still includes another screw part (16). Because the technology for manufacturing a screw has a high cost, operation of assembling the screw (that is, screwing in and together) requires much labor and time, and a lot of components (two components: the front segment 14 and the back segment 15) are needed for constructing a ferrule holder, in a conventional unit disclosed in the patent document 1.

(Problem 1)

Moreover, the conventional unit shown in the above-described patent document 1 has the following problems.

(Problem 2)

A cable adaptor 6 and a tubular main body 2 are bonded by mold forming of the tubular main body 2. Because of that, the cable adaptor 6, which is already completed as a component, is essential in a process for producing components which form the tubular main body 2. Accordingly, it is impossible to carry out a process for manufacturing components for the cable adaptor 6 and a process for manufacturing components for the tubular main body 2 independently and in parallel. Such manufacturing processes prolong the manufacturing time of a unit.

Moreover, the necessity for using the cable adaptor 6 in a process of manufacturing components for the tabular main body 2 complicates the process for manufacturing the tabular main body 2 itself, which also limits a productivity of a unit.

(Problem 3)

In the conventional unit, as illustrated by an arrow 22 in FIG. 5 of the patent document 1, at least the back segment 15 should be forced to pass through the tubular main body 2 from the opening part of the front end 3. In order to force the back segment 15 to pass through, however, excessive pressure is exerted to the tubular main body 2, especially to the front end 3. Because of that, the tubular main body 2 is often damaged while assembling it, and problems persist in its productivity.

Moreover, technology for sufficiently improving the productivity has not been established yet, and components should be assembled with enough caution. Accordingly, productivity problems are also left in assembling process.

(Problem 4)

The conventional unit needs to have a window 10 and a groove hole 12 as shown in FIGS. 1 and 2 of the patent document 1, but they are not so easy to form.

When components are forced to pass through the main body, too much stress is applied to the opening part of the end part 3. So it is difficult to determine optimum thickness of this portion of the tubular main body. When this thickness is too large, it becomes difficult to force the components to pass through the tubular main body and the problem 3 described above becomes a remarkable problem. When this thickness is too small, the front end part 3 tends to be damaged or distorted.

Moreover, it is difficult to determine optimum width and length of the groove hole 12.

Further, optimum size (thickness, width, length, etc.) for each component tends to depend on materials which construct the tubular main body 2. Accordingly, shape, size and other details of each component in the tubular main body 2 may hardly have flexibility to be applied to material changes, which makes it difficult to design each component.

(Problem 5)

In the above-described conventional unit, a ferrule holder 13 has a vane part (projection 19) as shown in FIGS. 3–7 of the patent document 1. Because the structure of the ferrule holder 13 with the vane part is not so simple, the ferrule holder 13 must be formed in the same process as that of the conventional unit: that is, the front segment 14 and the back holder 13 are formed separately. Manufacturing the ferrule holder 13 having such a complicated structure, however, can never be improved in light of its productivity. Moreover, that is actually one of the causes of the problems with respect to the number of components and screwing part (problem 1).

(Problem 6)

In the conventional unit, a fit groove, which is in an approximately ring shape and is very shallow, is formed on the external wall of an opening part of the forward end 3 in the tubular main body 2, which is made of resin, as shown in FIG. 1 of the patent document 1. The fit groove corresponds to a fit groove g2 shown in FIG. 7 of the present application. The fit grove g2 comprises a dividing sleeve S which functions to connect, for example, a conventional dividing sleeve unit u1 and the tubular main body 2 of the above-identified conventional unit as shown in FIG. 8 of the present application. The fit groove g2 and a convex part g1, which is formed in an approximately ring shape at the internal wall of the opening part of the dividing sleeve holder (metal components K1 and K2), shown in FIG. 8 of the present application are connected at a point γ shown in FIG. 7 of the present application.

In order to examine dirt and clean the end plane of the ferrule 18 shown in FIG. 7 of the present application periodically, fitting is temporally loosened and the dividing sleeve unit u1 is needed to separated from the plug 10'.

But because the fit groove g2 made of resin is very shallow, the fit groove g2 may gradually be worn away through friction with the convex part g1 until it becomes almost flat when operation of fitting/separating is repeated over and over again. Accordingly, it is very difficult for this fitting to maintain sufficient and secure connection between components for a long term.

In order to form this fit groove g2, which is easily flattened, deeper and to improve its bonding strength, thickness of the bottom of the fit groove g2 is further decreased or thickness of the ring-shaped end part of the front end part 3 which is placed at the former side of the fit groove g2.

By applying the former process of further thinning the bottom of the fit groove g2, however, the front end part 3 loses its strength toward dilatation and deformation after enforced passage, and that tends to cause problems in yield. Furthermore, by applying the latter process of thickening the end part of the front end part 3, elasticity of the front end part 3 is lost and it becomes further difficult or completely impossible to enforce passing through the front end part 3. Alternatively, by applying the latter process, fitting operation with the dividing sleeve unit u1 becomes too stiff, and that is very inconvenient.

Consequently, it is quite difficult to improve connection between the dividing sleeve unit u1 and the tubular main body 2 in the conventional unit with only applying a simple adjustment such as forming the fit groove g2 deeper. Moreover, little room for improvement is left with respect to only controlling depth of the groove.

The present invention has been accomplished in order to overcome the aforementioned drawbacks. An object of the present invention is to provide an optical contact unit with simple structure and less components, which is not prevented from being downsized, has excellent productivity in relation to production cost of each component and time required for constructing an optical contact unit, is easier to maintain its yield, is easily developed (designed), and has an improved structure over the conventional unit.

Here, each object listed above may be enough to be fulfilled individually by at least one of each method described above, and each invention in the present application is not necessarily secure that there is a solution which solves all the problems at once.

In order to solve the above-described problems, the following methods may be effective.

That is, a first aspect of the present invention is an optical contact unit which constructs an elastic contact at which a ferrule A connected to the end part of an optical fiber is faced and mechanically couples on another ferrule B placed at the front side of the ferrule A, comprising: a ferrule holder which holds the ferrule A and the back end part to which the optical fiber of the ferrule A is connected; an elastic member which gives the ferrule holder elasticity to translate in the optical axis direction of the optical fiber and holds the ferrule holder; a tubular main body comprising at least the ferrule holder and the elastic member; and a tubular cable adaptor which is inserted to the back opening part of the main body and is penetrated by the optical fiber, wherein the main body comprises a first small diameter part which has a first contact plane extending approximately vertical from the internal surface of the main body toward inside, the cable adaptor comprises a large diameter part which has a second contact plane extending approximately vertical from the external surface of the cable adaptor toward outside, a maximum radius of the large diameter part is larger than a minimum radius of the first small diameter part, the large diameter part is installed at the front side of the first small diameter part, and the second contact plane contacts to the first contact plane.

Here, the ferrule B is not comprised in the optical contact unit. The direction from the optical axis of the ferrule A to the ferrule B, which is connected with the ferrule A, is the forward direction, and is referred to as the positive direction of the z axis in coordinate system hereinafter. Accordingly, the forward direction means that value of the x-coordinate becomes relatively larger.

Furthermore, each of the large diameter part and the small diameter part in the present invention may be formed by forming either a concave part or a convex part at either internal surface or external surface of the cylinder. One of the objects for forming large and small diameters is to form a contact plane according to steps, and that can be achieved by forming either a concave part or a convex part at either internal surface or external surface of the cylinder in the present invention.

The elastic member described above also includes a conventional metal coil spring. Alternatively, the elastic member of the present invention is not limited thereto. As an elastic member, for example, an appropriate resin or synthetic rubber in an approximately tube shape can be employed.

A second aspect of the present invention is that a second small diameter part having a third contact plane, which extends approximately vertical from the internal surface around a front opening part of the main body toward inside, is formed in the main body, wherein the maximum radius of the ferrule holder is smaller than the minimum radius of the first small diameter part and larger than the minimum radius of the second small diameter part and an edge of the front opening part of the ferrule holder contacts to the third contact plane.

A third aspect of the present invention is that a taper part which helps to insert the cable adaptor into the main body formed at the forward part of the large diameter part of the cable adaptor.

A fourth aspect of the present invention is that the taper part which helps to insert the cable adaptor is formed at the back side of the first small diameter part.

A fifth aspect of the present invention is that a slit which penetrates from the back opening part in the optical axis direction is formed at the main body, wherein the slit reaches deeper in the forward direction into the main body than the first small diameter part.

A sixth aspect of the present invention is that a slit which penetrates from the front opening part of the main body in the optical axis direction and a concave part which fits with the rare edge part of a dividing sleeve unit comprising and keeping a dividing sleeve and is formed on the internal surface of the front opening part are formed in the main body.

The convex part is preferably formed in an approximately ring shape whose axis almost corresponds to that of the dividing sleeve. The concave part, however, is not necessarily formed in a ring shape. It may be formed, for example, at the internal surface of the approximately cylinder shape in circular direction sequentially or partially.

A seventh aspect of the present invention is that the elastic member described above is formed by using a metal coil spring.

An eight aspect of the present invention is that the external surface of the cable adaptor is formed in an approximately rotator shape whose rotational axis is in the optical axis direction and the large diameter part is formed almost in a circle in circumferential direction around the external surface.

A ninth aspect of the present invention is that a through-type hole, which is formed at a supporting member which supports the cable adaptor and has an axis approximately corresponding to that of the cable adaptor, comprises at least a portion of the cable adaptor and that a rotational asymmetric part, which is asymmetric to the rotation around the axis of the cable adaptor, is formed at the external surface of the cable adaptor, wherein a rotation preventing part is formed at the internal surface of the through-type hole and the rotational asymmetric part contacts to the rotation preventing part. Here, the rotational asymmetry represents that a cross-sectional view perpendicular to the rotational axis is not approximately a circular shape. Accordingly, 180 degrees rotation or 90 degrees rotation may also be referred to as rotational asymmetry.

A tenth aspect of the present invention is that the rotational asymmetric part is formed by two planes which are approximately parallel with each other and sandwiching the axis of the cable adaptor.

An eleventh aspect of the present invention is that an optical plug which functions to face and connect forward facet of two ferrules comprises any one of the above-described optical contact units.

Through employment of the aforementioned aspects of the present invention, the aforementioned drawbacks can be overcome effectively and rationally.

EFFECT OF THE INVENTION

Effects to be obtained by the present invention are explained as follows.

That is, according to the first aspect of the present invention, the main body and the cable adaptor can be connected without forming a screwing part or carrying out molding. As a result, neither too much time nor high technique is required in order to connect the main body and the cable adaptor. Further, according to the first aspect of the present invention, processes for forming components of the cable adaptor and the main body, respectively, can be carried out independently and in parallel.

Accordingly, by employing the first aspect of the present invention, smaller connection structure between the main body and the cable adaptor can be obtained with cheaper production cost in shortened time compared with the conventional connection. In short, the above-described problems 0 and 2 can be overcome in the present invention.

According to the second aspect of the present invention, because the front edge part of the ferrule holder contacts the third contact plane, the ferrule holder can be prevented from translating to the forward direction.

In the conventional unit in the Patent document 1, translational movement is restricted by contacting the projection part 19 and the end wall 11 of the window 10, and that cannot overcome problems 5 and 1 described above. On the contrary, according to the second aspect of the present invention, the convex part 19 in the conventional invention is not necessarily formed at the ferrule holder, resulting in solving the problems easily.

Further, according to the second aspect of the present invention, the maximum diameter of the ferrule holder is smaller than the minimum diameter of the first small diameter part. That enables insertion and fitting of the ferrule holder into the main body without distorting the shape of the main body. Thus, penetrating the ferrule holder as in the conventional composing process is never required according to the second aspect of the present invention, resulting in solving the problems 3 and 4 described above easily.

According to the third and the fourth aspects of the present invention, the taper part effectively disturbs to enlarge the minimum diameter of the first small diameter part and to reduce the maximum diameter of the large diameter part. That enables installation of the large diameter part of the cable adaptor at the position forward to the small diameter part of the main body without using any special component material or tool. Thus, penetrating process in the conventional invention is never required according to the third and the fourth aspects of the present invention, resulting in solving the problems 3 and 4 described above easily.

According to the fifth aspect of the present invention, the slit effectively distributes to enlarge the minimum diameter of the first small diameter part. That enables installation of the large diameter part of the cable adaptor at the position forward to the small diameter part of the main body without using any special component material or tools. Thus, the penetrating process in the conventional invention is never required according to the fifth aspect of the present invention, resulting in solving the problems 3 and 4 easily.

According to the sixth aspect of the present invention, the concave part (fitting part) can be formed deeper at the front opening part of the main body compared to the conventional invention, which enables fit the optical contact unit and the dividing sleeve unit sufficiently.

Owing to its own make-and-break action, the slit installed at the front opening part of the main body functions to avoid or relax abrasion of the concave part (fitting part) when the back end part of the dividing sleeve unit separates from the front opening part of the main body. As a result, bonding strength between the main body and the dividing sleeve unit can be maintained more sufficiently for a longer time compared with that in the conventional invention.

Considering the design and method for processing of each component related to the unit, it is easier and more preferable that the concave part (fitting part) is formed in an approximately ring shape whose axis corresponds to that of the dividing sleeve.

According to the seventh aspect of the present invention, movable range of the ferrule A in the optical axis direction and also elasticity of the ferrule A toward the ferrule holder can be sufficiently obtained. Thus, according to the seventh aspect of the present invention, it becomes remarkably easy to surely adhere contact planes of each end point of the ferrule A and the ferrule B at a proper pressure even when plural kinds of manufacturing tolerances exist a lot in the optical axis direction in the process of manufacturing the optical contact unit.

And because the elasticity can be easily formulated by parameters such as materials, thickness, and numbers of roll of the coil, it can be optimized quite easily by selecting the design parameters. Thus, the elastic member can be optimally obtained with remarkable ease and low cost according to the seventh aspect of the present invention.

According to the eighth aspect of the present invention, the large diameter part of the cable adaptor can be formed easily by grinding a rotating tubular member.

In a process of inserting and composing the cable adaptor into the main body, the minimum diameter of the first small diameter part is expected to be temporally larger than the maximum diameter of the large diameter part by enlarging the minimum diameter of the first small diameter part or reducing the maximum diameter of the large diameter part. Because components such as the optical fiber may be contained inside of the cable adaptor tube, it is more preferable that the minimum diameter of the first small diameter part of the main body is enlarged to keep space for the components. Thus, it is generally preferable that the cable adaptor is made of metal and that the main body is made of relatively soft resin.

Even when the cable adaptor is made of a stiff metal as described above, the large diameter part of the cable adaptor can be easily obtained according to the eighth aspect of the present invention by carrying out processes such as grinding the metal.

According to the ninth aspect of the present invention, a rotational asymmetry part contacts to the rotation preventing part and rotation of the optical contact unit is prevented. As a result, the optical contact unit can be surely fixed in the through-hole of its supporting member at least in a rotation direction around the axis.

According to the tenth aspect of the present invention, the rotational asymmetry part and the rotation preventing part, which surely prevent rotation of the optical contact unit, can be efficiently and easily obtained without preventing downsizing of the optical contact unit. And because both planes which face sandwiching the axis of the cable adaptor and are approximately parallel with each other are formed in the same shape and the same size, half-turn around the axis shows rotational symmetry. The cable adaptor can be composed at two positions, or both at 0° and 180° positions in the circle around the axis. Consequently, rotational direction for composing the cable adaptor may not be limited in one way, which enables to obtain excellent composing efficiency.

According to the eleventh aspect of the present invention, the optical plug which comprises the optical contact unit having at least any one of the actions and effects described above may essentially obtain each of its advantage. Thus, according to the eleventh aspect of the present invention, at least junction structure of the main body of the optical contact unit and the cable adaptor can be formed in a smaller size with cheaper cost compared with that in the conventional invention, and further manufacturing time can be decreased compared with that in the conventional invention. Moreover, other actions and effects of the optical contact unit described above can also be obtained.

BRIEF DESCRIPTION OF THE DRAWINGS

FIG. 5A is a side view of an adaptor unit 1000 connected with a front opening part 134 of the main body 130.

BEST MODE FOR CARRYING OUT THE INVENTION

Embodiments of the present invention will next be described based on concrete examples. The scope of the present invention, however, is not limited to the embodiment described below.

First Embodiment

Figure 1:
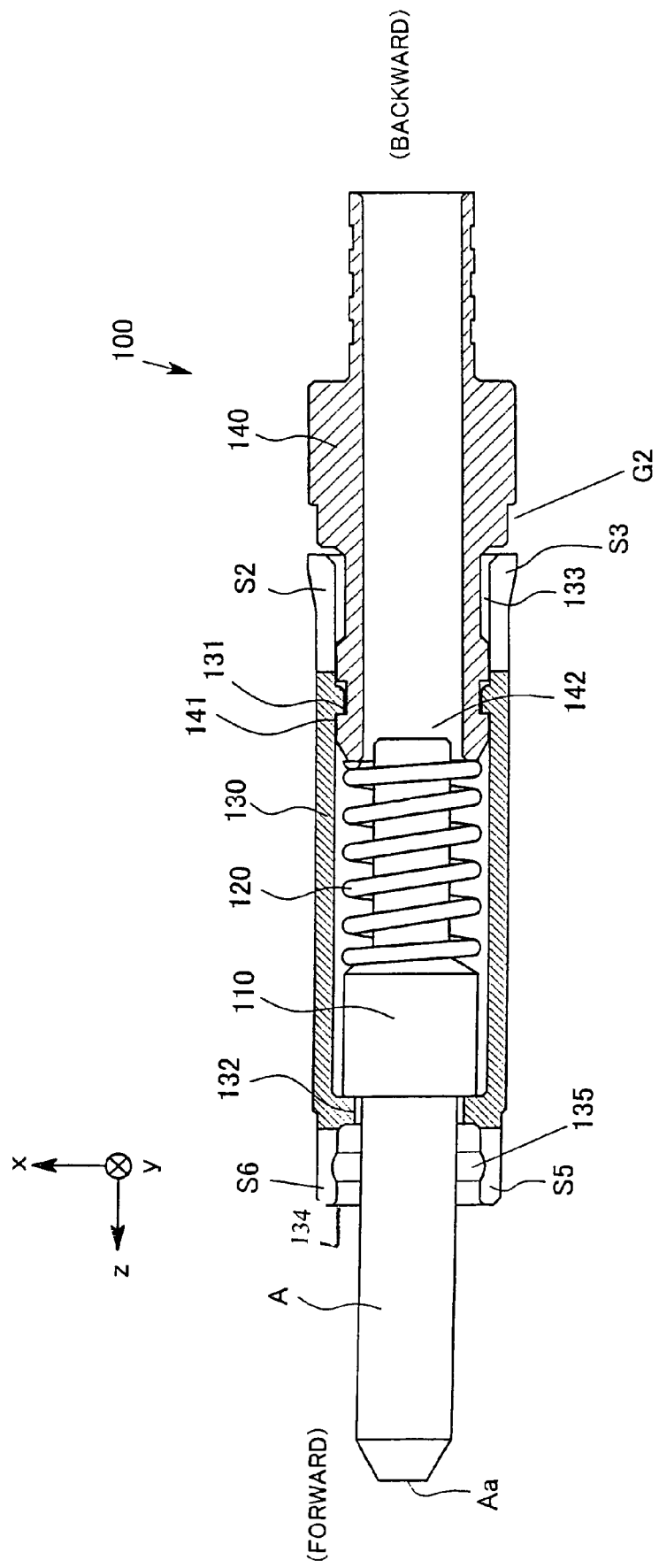
FIG. 1 is a sectional view of an optical contact unit 100 according to a first embodiment of the present invention.

FIG. 1 is a sectional view of an optical contact unit 100 of an embodiment 1 in the present invention. A side view is shown with respect to a ferrule A, a ferrule holder 110, and a coil spring 120 (: elastic member). The optical contact unit 100 provides an elastic contact to face and automatically couples the ferrule A connected to the end part of an optical fiber on another ferrule B which is not illustrated in FIG. 1 and is placed at the front side of the ferrule A. Aa shown in FIG. 1 represents an end plane of the ferrule A, and that is a contact plane which contacts to the ferrule B.

The ferrule holder 110 and the coil spring 120 are comprised in a main body 130 formed in a tubular shape. A cable adaptor 140 comprising a large diameter part 141 and a front opening part 142 is inserted to the main body 130 from a back opening part 133 having slits S2 and S3. A first small diameter part 131 of the main body 130 binds with the large diameter part 141 of the cable adaptor 140 and prevent the cable adaptor 140 from translating in the z-axis direction. And a second small diameter part 132 of the main body 130 restricts translation movement of the ferrule holder 110 to the z-axis direction.

Figure 2:
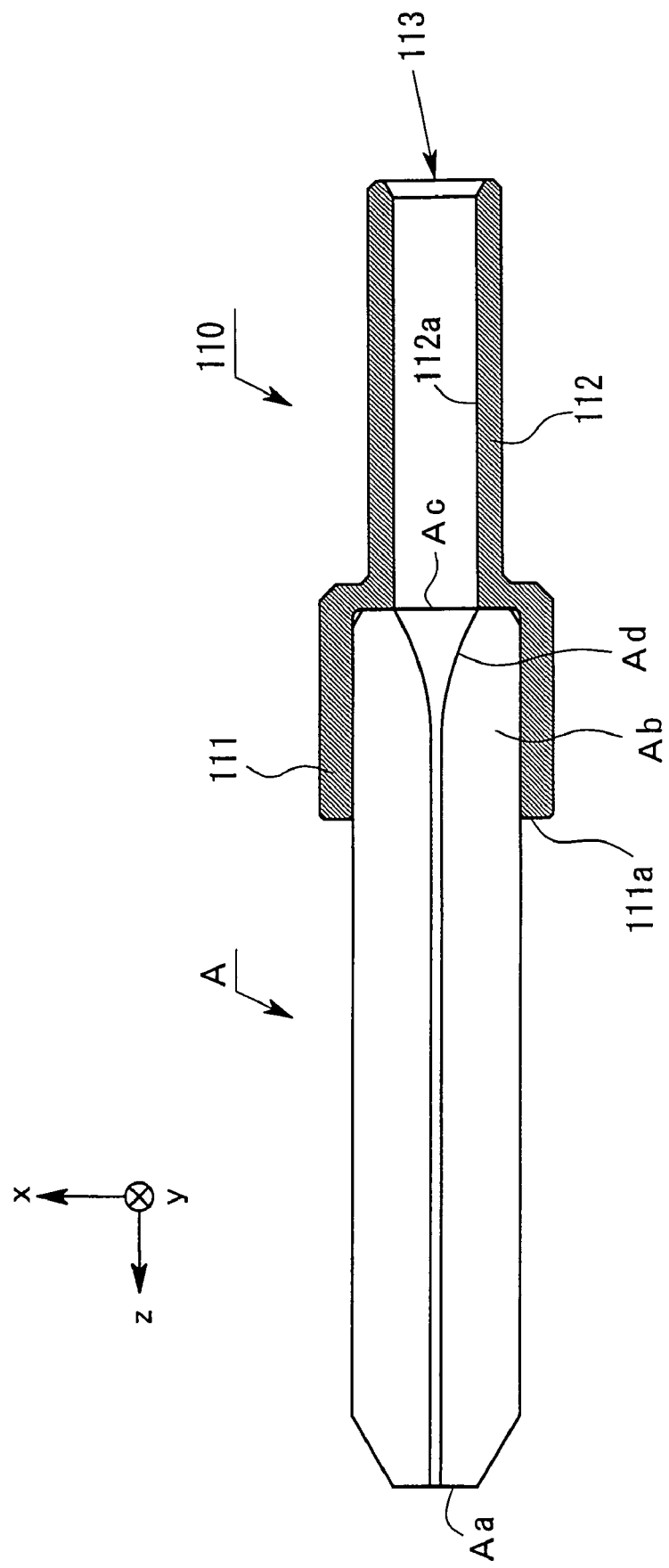
FIG. 2 is a sectional view of a ferrule holder 110 of the optical contact unit.

FIG. 2 is a sectional view of a ferrule holder 110 of the optical contact unit 100. The ferrule holder 110 has approximately tubular internal surface, and the back end part Ab of the ferrule A is pressed and adhered to be fixed in the front opening part 111 of the ferrule holder 110. A guide plane Ad which guides the optical fiber to insert is formed to be an inclined plane of approximately cone shape having a little curvature. A thin neck part 112 of the ferrule holder 110 is formed in a thin tubular shape whose diameter is smaller than that of the front opening part 111 and its inner surface 112a is connected with the guide plane Ad successively and evenly at a bottom plane Ac level of the ferrule A.

The edge of the optical fiber which is to be connected to the ferrule A is inserted from the back opening part 113 of the ferrule holder 110, goes through the internal surface 112a, is inserted from the top part of the cone-shaped guide plane Ad of the ferrule A and is fixed in the ferrule holder 110.

Figure 3A:
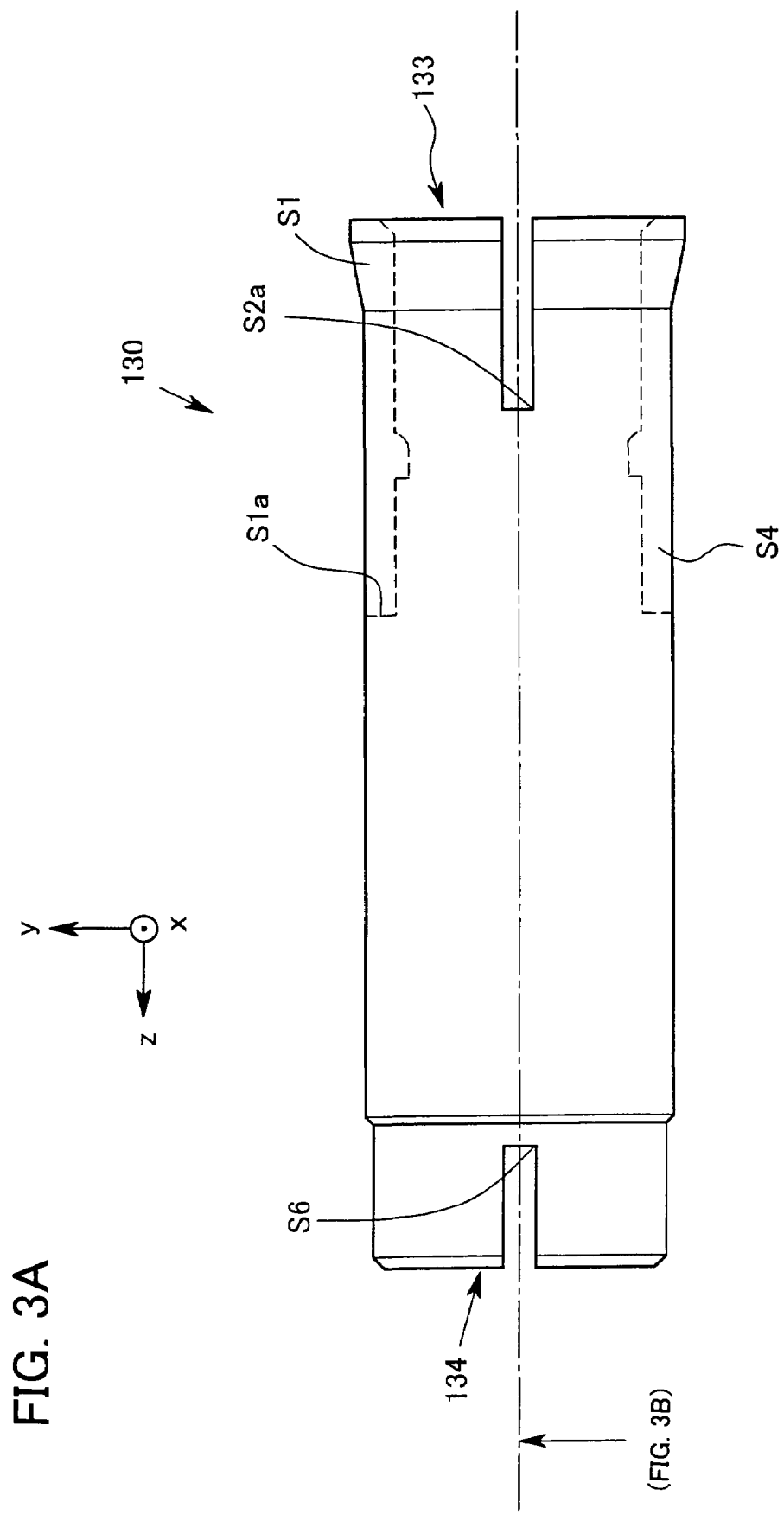
FIG. 3A is a top view of a main body 130 of the optical contact unit 100.
Figure 3B:
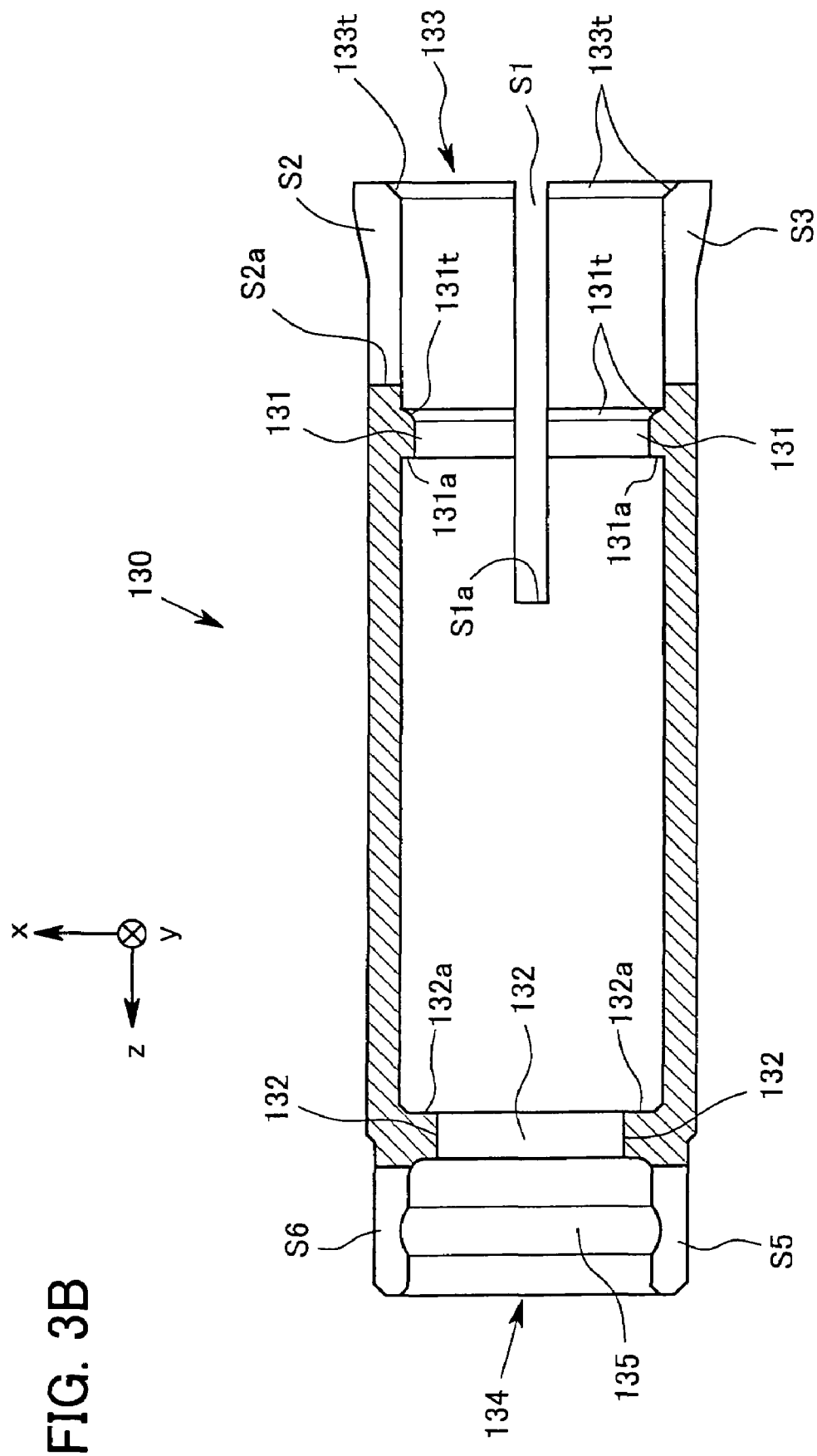
FIG. 3B is a sectional view of the main body 130 of the optical contact unit 100.

An edge 111a of the front opening part 111 of the ferrule holder 110 contacts to a third contact plane 132a of the second small diameter part 132 of the main body 130 shown in FIGS. 3A and 3B. They are contacted when the coil spring 120 shown in FIG. 1 has the largest length in the z-axis direction and are released when the edge plane Az of the ferrule A is pressed by the edge plane of (contact plane) of the ferrule B which is not shown in figures in the negative direction of the z-axis with a certain or more level of strength.

FIGS. 3A and 3B illustrate a top view and a sectional view of the main body 130 in the optical contact unit 100. The main body 130 is made of resin and is formed in approximately cylindrical cavity between the front opening part 134 and the back opening part 133. The second small diameter part 132 is formed at the back side of the front opening part 134 and the first small diameter part 131 is formed at the front side of the back opening part 133. Each of these small diameter parts projects toward inside from the inner surface of approximately cylindrical main body 130 and is formed in a circuit in circumferential direction like a ring. Accordingly, each axis of the first small diameter part 131 and the second small diameter part 132 is identical to the main body 130.

The inside diameter of the first small diameter part 131 is larger than the outside diameter of the front opening part 111 of the ferrule holder 110 shown in FIG. 2 and the inside diameter of the second small diameter part 132 is smaller than the outside diameter of the front opening part 111. Accordingly, when the ferrule A and the ferrule holder 110 which are constructed as shown in FIG. 2 are inserted to the optical contact unit from the back opening part 133, the front opening part 111 can pass through the inner side of the ring of the first small diameter part 131 without any resistance. Then the edge part 111a contacts to the contact plane 132a which can stop the combination of the ferrule A and the ferrule holder 110 without fail.

At the back side (: back surface) of the first small diameter part 131, a taper part 131t is formed in a circuit in circumferential direction so that the inside diameter of the main body 130 corresponding to the taper part 131t becomes smaller as the z-axis coordinate increases. The front plane of the first small diameter part 131 is formed to be approximately vertical to the internal surface of the main body 130, which forms a first contact plane 131a at the internal surface of the main body 130.

Figure 4A:
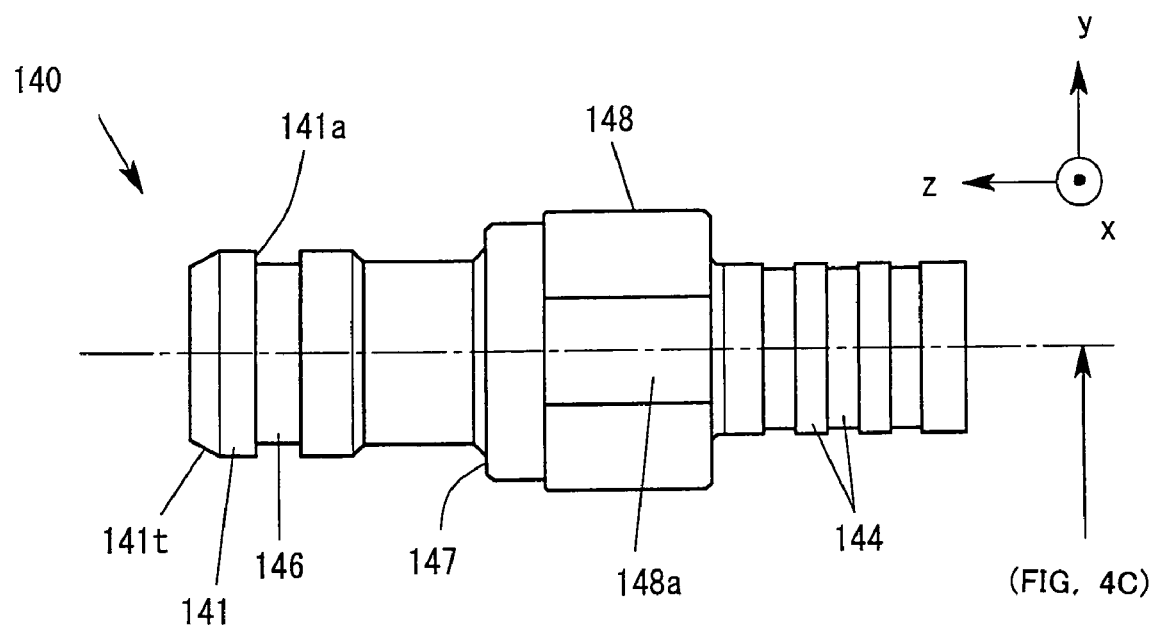
FIG. 4A is a side view of a cable adaptor 140 of the optical contact unit 100.
Figure 4B:
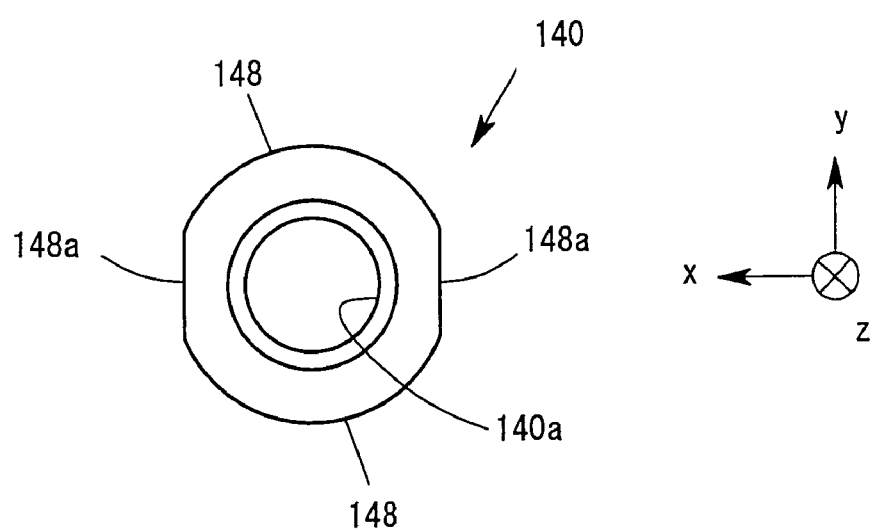
FIG. 4B is a back view of the cable adaptor 140 of the optical contact unit 100.
Figure 4C:
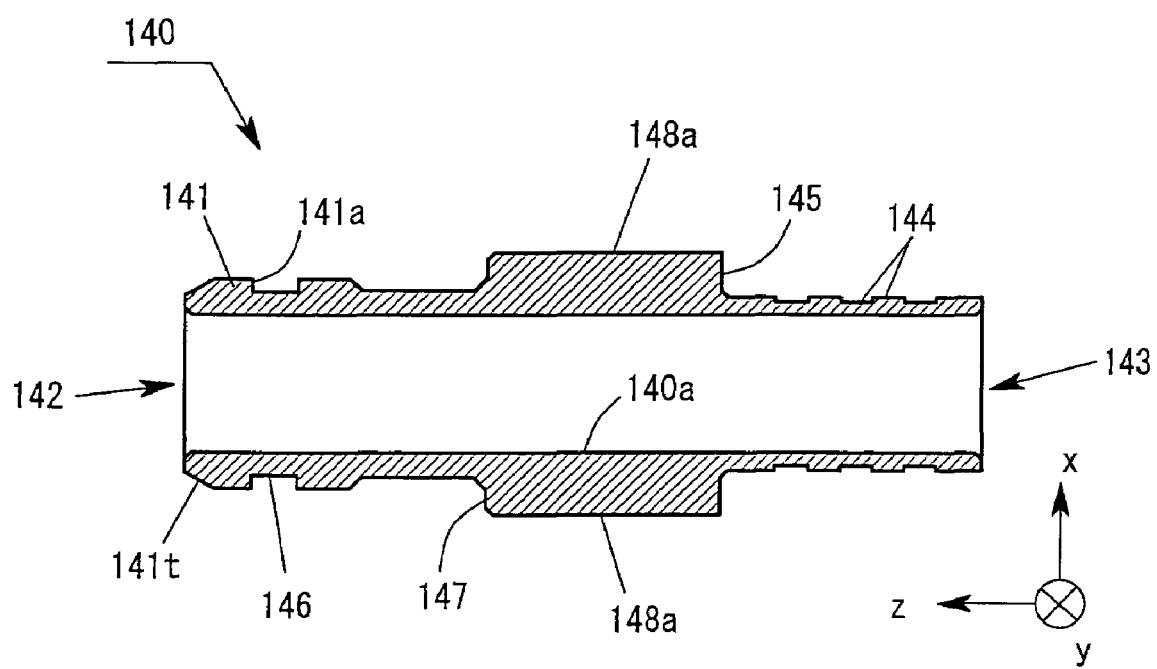
FIG. 4C is a sectional view of the cable adaptor 140 of the optical contact unit 100.

The first contact plane 131a is formed to contact to a second contact plane 141a shown in FIGS. 4A–4C, and they contact with each other when the main body 130 fits with the cable adaptor 140 as illustrated in FIG. 1. The taper part 131t makes this fitting (constructing) operation of the main body 130 and the cable adaptor 140 possible or easier.

Also, a taper part 133t is formed in a circuit in a circumferential direction at the internal surface of the edge of the back opening part 133 so that the inside diameter of the main body 130 corresponding to the taper part 133t becomes smaller as the z-axis coordinate increases. The taper part 133t helps to insert the edge of the cable adaptor 140 (the front opening part 142 in FIGS. 4A–4C) smoothly into the back opening part 133 of the main body 130 so that the main body 130 and the cable adaptor 140 are connected as shown in FIG. 1.

Four slits in total are formed around the x-axis at each 90° in circumference direction at the back opening part 133. A slit S1 is formed from the edge part of the back opening part 133 passing through the first small diameter 131, and its end point S1a is apart from the contact plane 132a in the forward direction. A distance between the end point S1a and the contact plane 132a is a little larger than the maximum radius of the internal surface of the cylindrical main body 130. A slit (: slit S4), which is equivalent to the slit S1, is formed at the 180° opposite side from the slit S1.

Slits S2 and S3 are formed similarly, however, neither of their end points S2a nor S3a reaches the first small diameter part 131. Each depth of the slits S2 and S3 is determined as half a depth of the slit S1.

A groove 135 formed in an approximately circular arc shape is formed to insert an opening part of a dividing sleeve unit from the front opening part 134 and fix the cable adaptor 140 therein. Two slits S5 and S6, which are formed at a 180° interval facing each other, function to help fitting (constructing) operation and releasing (deconstructing) operation.

FIGS. 4A–4C are a side view, a back view and a sectional view of the cable adaptor in the optical contact unit 100. The approximately cylindrical cable adaptor 140 is made of metal. After grinding the external surface of a rotated tubular metal rod, a cylindrical cave is bored around the axis of the rotation to obtain the cable adaptor 140. Two rotational asymmetric parts 148a are formed on an external surface 148, or the maximum outer diameter of the cable adaptor 140. These two rotational asymmetric parts 148a comprise two parallel planes each of which has rotational symmetry through 180° around the axis. The front opening part 142 and the back opening part 143 are connected by this cave. The optical fiber runs through this cave (in the inner surface 140a).

An approximately cylindrical pressure-bonding sleeve (not shown), which is made of resin, is installed to a concave and convex part 144. An external surface of the concave and convex part 144 is formed to have uneven pattern so as to prevent the installed pressure-bonding sleeve from shifting from the proper position. The sidewall 145 provides a contact plane to the pressure-bonding sleeve. Thickness of the maximum external surface 148 (outside diameter) is formed large and is equivalent to thickness (the maximum outside diameter) of the main body 130.

An approximately ring-shape groove 146 is formed on the external surface of the cable adaptor at the position which is about a radius to a diameter depth from the end part of the front opening part 142, or the forward bottom plane of the cable adaptor 140, in the negative direction of the z-axis. Depth and width of this groove 146 is designed so that the first small diameter part 131 of the main body 130 can be sufficiently settled therein.

A side plane, which is placed at the forward portion of the groove 146, stands almost vertical to the bottom plane of the groove 146 and the internal surface 140a of the cable adaptor 140. The second contact plane 141a of the large diameter part 141 is formed from this side plane. That is, the large diameter part 141 consists of an approximately flat top of the external surface which is placed just at forward part of the second contact plane 141a and this flat top, or the backward side plane of the large diameter part 141, corresponds to the second contact plane 141a in the first embodiment of the present invention. In the meantime, a taper part 141t is formed in a circuit in circumferential direction like a ring at the forward part of the large diameter part 141 so that the outside diameter of the external surface of the cable adaptor 140 corresponding to the taper part 141t becomes smaller as the z-axis coordinate increases.

The taper part 141t helps the large diameter part 141 to pass through the first small diameter part 131 smoothly when the main body 130 and the cable adaptor 140 are fit as shown in FIG. 1. Because the taper part 131t of the main body 130 and the taper part 141t of the large diameter part 141 contact and push with each other when the cable adaptor 140 is inserted to the main body 130, the taper part 141t temporarily pushes the inside diameter of the first small diameter part 131 and can move forward sliding on the taper part 131t. At that time each width of the above-mentioned slits S1 and S4 formed at the back opening part 133 is temporarily expanded by pressure of the taper part 141t, which makes it easier to extend the inside diameter of the first small diameter part 131. The slits S2 and S3 are formed to have smaller length in the z-axis direction than length of the slit S1, and they do not penetrate the first small diameter part 131. As a result, rigidity of the first small diameter part 131 can be sufficiently maintained.

As the cable adaptor 140 penetrates through the main body 130, the second contact plane 141*a* is pushed forward of the first contact plane 131*a*. At this time, each of the first small diameter part 13 and the large diameter part 141 is restored to its original state by its own elasticity. Then the second contact plane 141*a* contacts to the first contact plane 131*a* and the cable adaptor 140 cannot be detached or shifted from the main body 130 even when it is pulled in the negative direction of the z-axis.

By applying this structure, the optical contact unit 100 which is constructed as shown in FIG. 1 can be obtained only by inserting the ferrule A, which is constructed to the ferrule holder 110 as shown in FIG. 2, the ferrule holder 110, the coil screw 120 and the cable adaptor 140 in sequence into the main body 130 from the back opening part 133 and pushing the cable adaptor 140 until the second contact plane 141*a* penetrates forward of the first contact plane 131*a*. That is, construction of those components is quite easy.

Accordingly, in the first embodiment of the present invention, the optical contact unit 100 with simpler structure and less components, which helps to form the optical contact unit 100 smaller, has excellent productivity in relation to production cost of each component and time required for constructing it, is easier to maintain its yield, is easily developed (designed), and has more excellent structure than a conventional unit can be obtained.

Figure 5B:
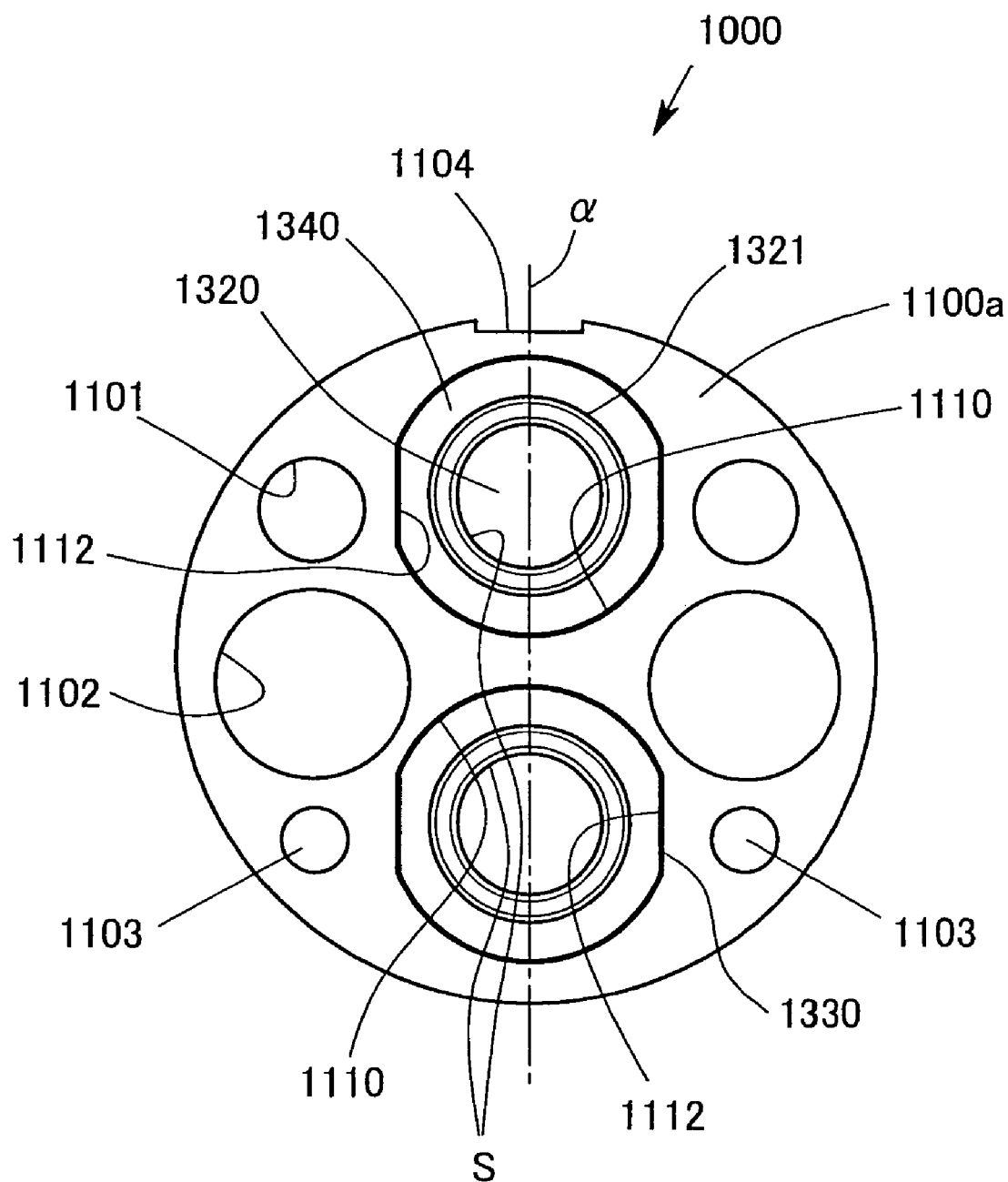
FIG. 5B is a back view of the adaptor unit 1000.

FIGS. 5A and 5B illustrate a top view and a sectional view of an adaptor unit 1000 which is connected to the front opening part 134 of the main body 130 in the optical contact unit 100.

An adaptor unit 1100 is made of an insulator and has six through-holes in total (through holes 1101, 1102 and 1103) each of which has different size and is formed at back and front sides. Each component, which functions as a contact point for electric wiring such as metal pin, is inserted and arranged in the through-type holes 1101 and 1102. In the through-type hole 1110 having the largest diameter, two dividing sleeve units are inserted and arranged symmetrically at its upside and downside. In FIG. 5B, S represents the dividing sleeve. The adaptor unit 1000 is formed symmetrically on either side of a plane α which comprises each axis of those two dividing sleeves S.

Two back end parts 1320 arranged vertically at a rear tubular part 1300 of the dividing holder, or an outer shell of the dividing sleeve unit, stick out from backward of a back bottom plane 1100*a* of the adaptor main body 1100. The component represented by 1321 is a hill part formed in an approximately ring shape on the external surface of each back end part 1320 and it can fit rightly with the circular arc shaped groove 135 (FIGS. 1 and 3-B). As mentioned above, the circular arc shaped groove 135 is formed in order to insert and fit the back end part 1320 of the dividing sleeve unit therein from the front opening part 134 (FIG. 3B), and each of the two slits S5 and S6 helps the fitting and releasing operations.

Figure 7:
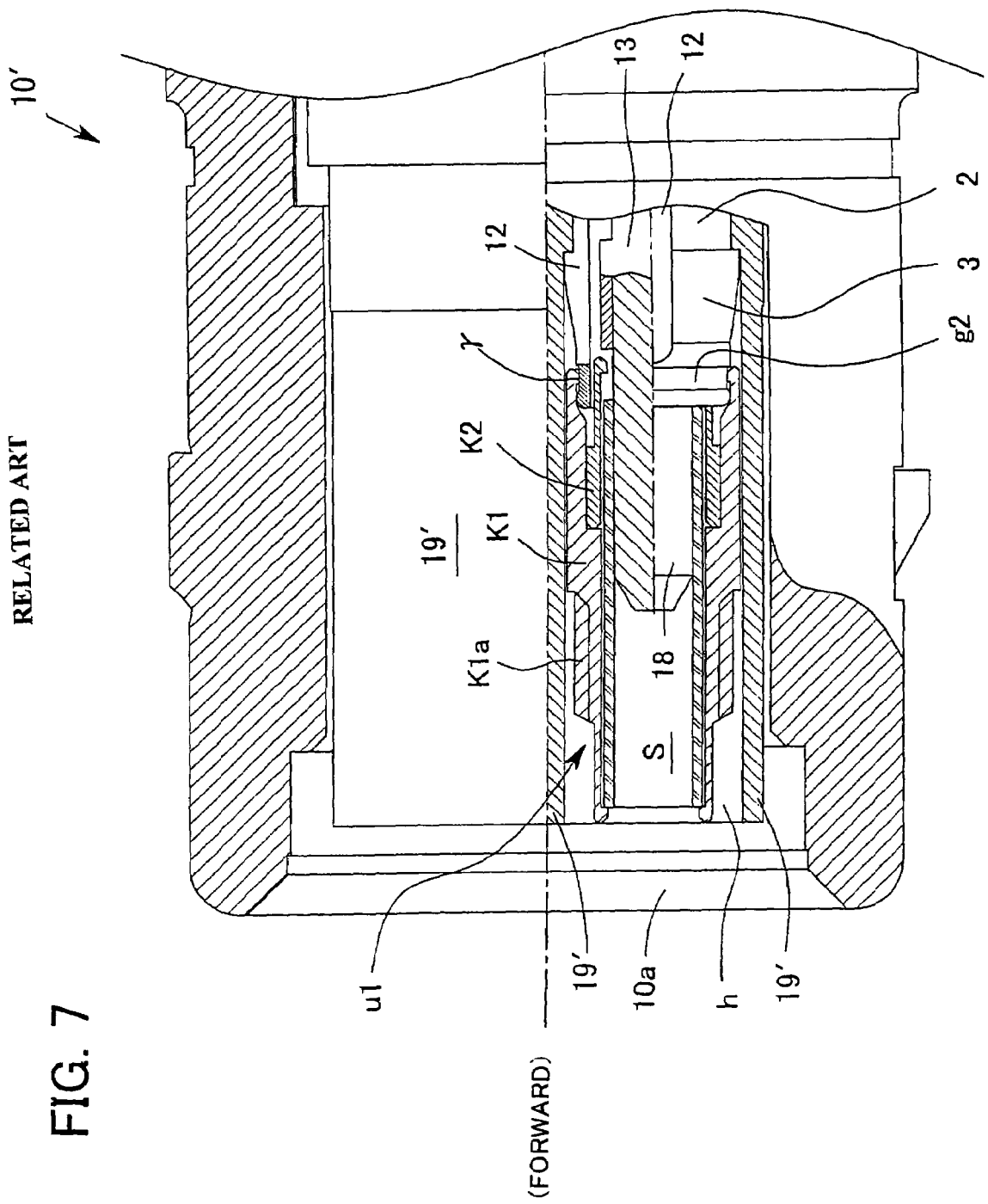
FIG. 7 is a sectional view of a conventional optical plug 10'.
Figure 8A:
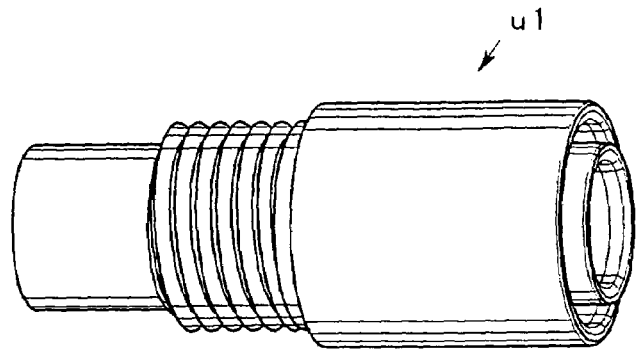
FIG. 8A is a perspective view of a conventional dividing sleeve unit u1.
Figure 8B:
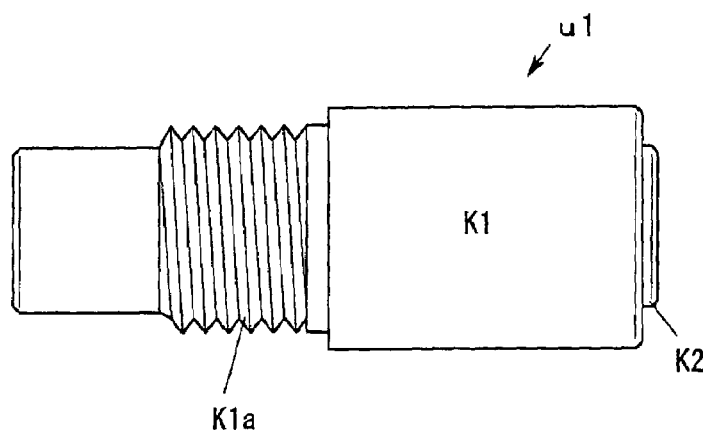
FIG. 8B is a side view of the conventional dividing sleeve unit u1.
Figure 8C:
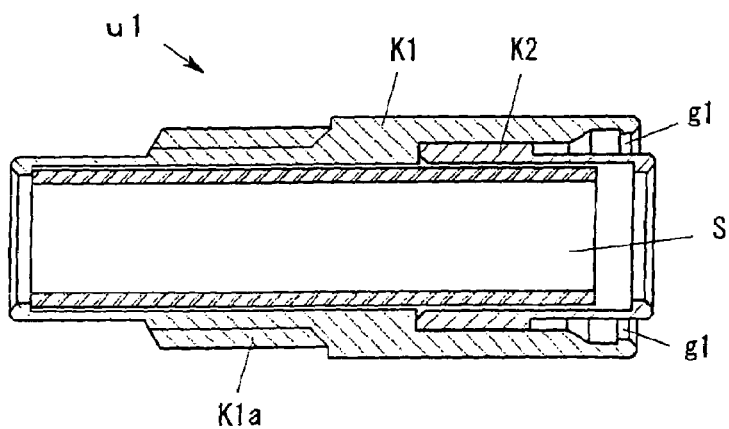
FIG. 8C is a sectional view of the conventional dividing sleeve unit.

By forming the slits S5 and S6 which rightly help fitting and releasing operations, the groove 135 can be formed deeper than the conventional one (the groove g in FIG. 7), which can provide sufficient fitting of the hill part 1321 and the groove 135. Because of the make-and-break operation of the slit S5 and S6, abrasion of the groove 135 caused when the back end part 1320 of the rear tubular part 1300 is released from the front opening part 134 of the main body 130 can be avoided or relaxed, which enables to maintain excellent bonding strength between the main body 130 and the dividing sleeve unit for longer period compared with the conventional unit.

Second Embodiment

Figure 6A:
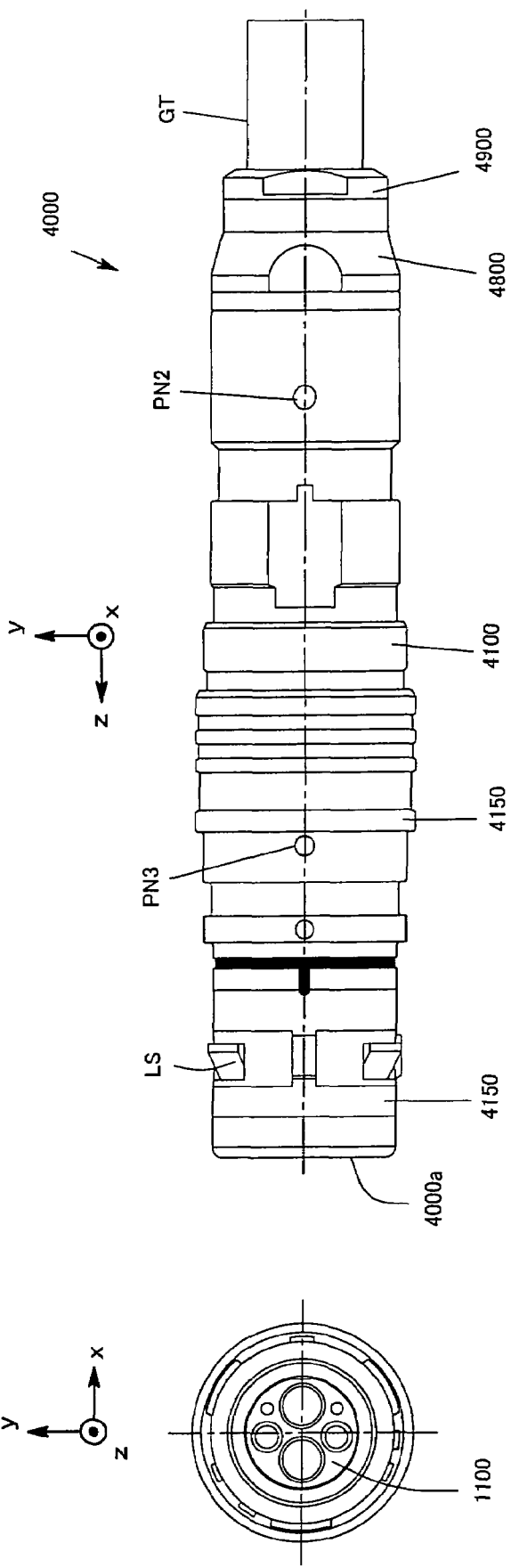
FIG. 6A is a front view and a top view of an optical plug 4000 according to a second embodiment of the present invention.
Figure 6B:
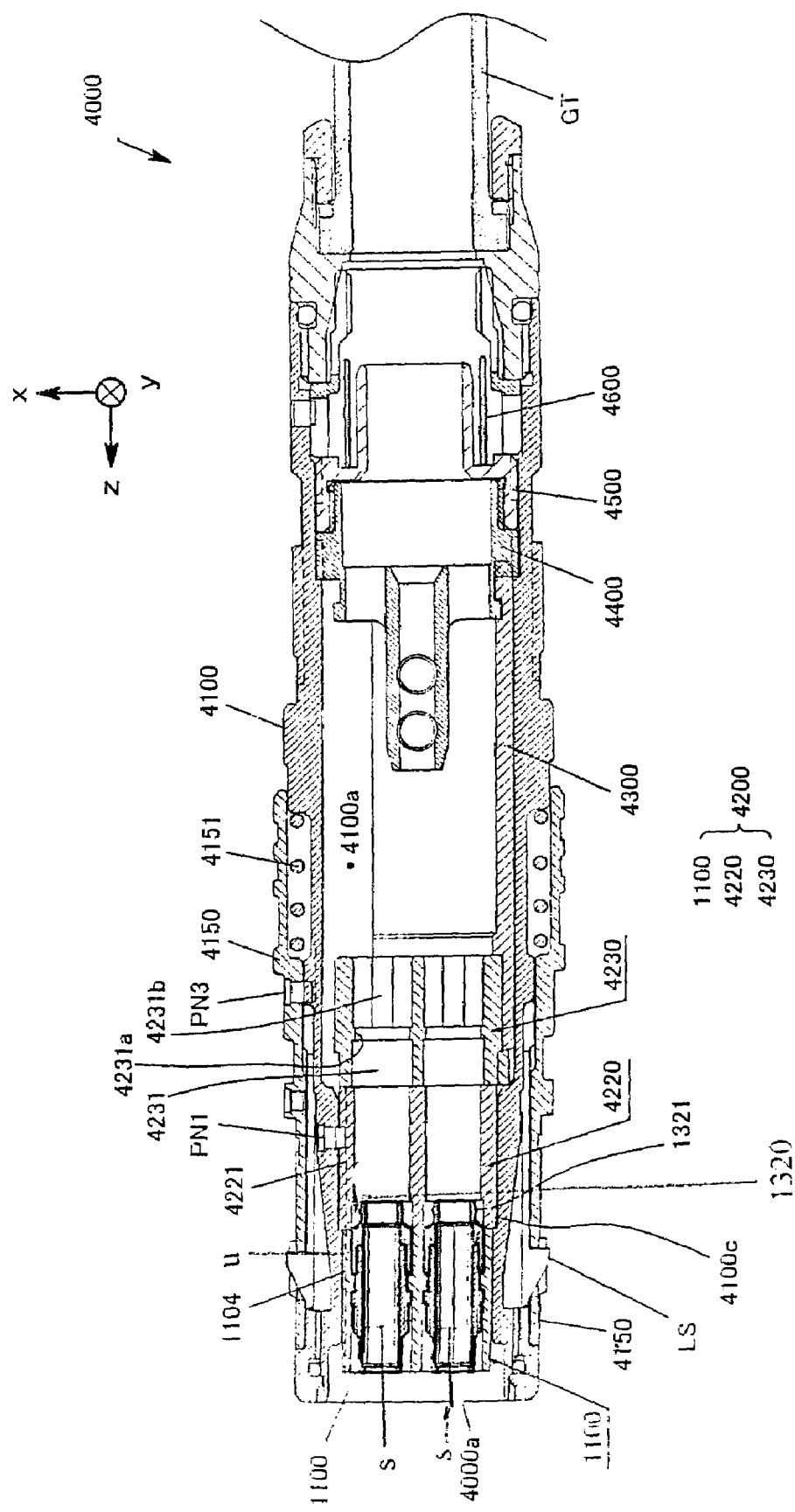
FIG. 6B is a sectional view of the optical plug 4000 according to the second embodiment of the present invention.

FIGS. 6A and 6B illustrate a front view, a top view and a sectional view of an optical plug 4000 in the second embodiment of the present invention. The optical plug 4000 comprises the adaptor unit 1000 of the embodiment 1 described above. An agraffe 4400, a cramp body 4500, a pressure-bonding sleeve 4600, and a gum tube GT consist of a cable fixing part of the optical plug 4000. In the second embodiment, the central axis of an approximately cylindrical female plug shell 4100 is the z axis and the direction from the gum tube GT to an edge 4000*a* of the female plug 4000 is the positive direction of the z axis.

A slide sleeve 4150 formed in an approximately cylindrical shape is supported by a screw 4151 resiliently and guided to the z axis direction by a guide pin PN3, which enables to shuttle in the z axis direction in a predetermined range. Accordingly, a latching sleeve LS is pumped in the slide sleeve 4150 in diameter direction of the female plug shell 4100.

An insert of the female plug 4000 comprises a front part, a middle part and a rear part which are made of insulator. That is, an insulator 1100 which is formed in the same shape as that shown in FIGS. 5A and 5B in the first embodiment consists of the front part of the insert, an insulator 4220 which is shown in FIG. 6B consists of the middle part of the insert, and an insulator 4230 shown in FIG. 6B consists of the rear part of the insert. These three insulators 1100, 4220 and 4230 are collectively called an insert 4200 hereinafter. The insert 4200 formed in an approximately cylindrical shape is inserted and installed at the inside of the internal surface 4100*a* of the female plug shell 4100 as illustrated in FIG. 6B, and is maintained in a condition that each end part of the transmission line can be freely fitted and separated with respect to each line to a certain male plug on which the female plug 4000 is coupled.

A concave part 1103 formed on the back 1100*a* of the insulator 1100 shown in FIG. 5B is formed to restrain relative rotational operation of the insulator 1100 and the insulator 4220 around the axis.

The groove 1104 and the groove 4221 formed at the insulator 1100 and the insulator 4220, respectively, are connected with each other to be one straight line. That functions as a guiding line which guides the pin PN1 in the z axis along the external surface of the insert 4200.

The insulator 4230, which consists of the rear part of the insert 4200, functions as a supporting member which supports the cable adaptor 140 and the through-type hole 4230 formed at the insulator 4230 includes the external surface 148 which is the maximum outside diameter of the cable adaptor 140. The axis of the through-type hole 4230 corresponds to that of the cable adaptor 140. Two rotation preventing parts 4231*b* which faces across the axis and are parallel with each other are formed at the internal surface of the through-type hole 4231 formed at the insulator 4230, and the two rotational asymmetric parts 148*a* shown in FIGS. 4A–4C are adjacent to these rotation preventing parts 4231*b*, respectively. As a result, rotational operation of the optical contact unit 100 around the axis in the insert 4200 can be completely restrained.

The rotational asymmetric parts 148*a* are formed by grinding and polishing the cylindrical external surface 148 and each of them, having an approximately flat shape, is formed at 180-degree turn in the opposite direction around the axis in a shape and size identical to each other. The angle which the rotational asymmetric parts 148a make around the axis is designed to be a proper angle (e.g.: around 40° to 500). When this angle is too small, the area at which the rotational asymmetric parts 148a contact to the rotation preventing parts 4231b becomes too small, which tends to leave a problem that rotational operation of the optical contact unit 100 cannot restrained sufficiently. In short, the angle which the rotational asymmetric parts 148a make angle around the axis efficiently contributes to sufficient restrain of rotational operation of the optical contact unit 100, downsizing of the insulator 4230 and the through-type hole 4231, and maintaining strength of each part of the insulator 4230.

In the present embodiment, two rotation preventing parts are formed at the through-type hole 4231. Alternatively, one or three rotation preventing parts may be formed. In order to obtain sufficient restraint of rotational operation of the optical contact unit 100, the eight rotation preventing parts can be formed up to eight or so at the through-type hole 4231 whose sectional view becomes an octagon.

Here proper, optimum, and appropriate position and number of the rotation preventing parts depends on processing accuracy of each part providing contact planes (e.g.: rotational asymmetric parts and rotation preventing parts) and hardness of materials comprised in the parts. The structure in the second embodiment can be applied to all the envisioned kinds of material. But when certain numbers of the rotation preventing parts are formed at certain positions which are different from those shown in this embodiment, operation of the unit cannot always be the same as described in the second embodiment.

The rotational asymmetric part for restraining rotation of the dividing sleeve unit can be formed at the front cylindrical part. Because only one rotational asymmetric part formed at either front cylindrical part or rare cylindrical part may be enough, it is possible to limit forming a rotational asymmetric part at one portion of those cylindrical parts. That enables to simplify forming the rotational asymmetric part on the dividing sleeve holder.

Alternatively, the rotational asymmetric part can be formed on the whole length in the optical axis direction of the dividing sleeve holder.

The concave part (: the groove G2), which is formed in an approximately ring shape at the optical contact unit 100 as illustrated in FIG. 1, fits with the convex part 4231a which is formed in an approximately ring shape on the internal surface of the through-type hole 4231 comprised in the insulator 4230. Each of the slits S1–S4 formed at the main body 130 of the optical contact unit 100 helps to close the rear opening part 133 of the main body 130, which enables to simplify constructing operation (fitting operation) to fit the groove G2 and the convex part 4231a. This fitting can be released by using a tool.

Other Modified Embodiment

While the present invention has been described with reference to the above embodiments as the most practical and optimum ones, the present invention is not limited thereto, but may be modified as appropriate without departing from the spirit of the invention. By applying and modifying the embodiment, effect of the present invention can be obtained.

Modified Embodiment 1

Each material for forming the ferrule holder 110, the coil spring 120, the main body 130 and the cable adaptor 140 is not limited to the material shown in the above described embodiment, but can be an arbitral material. The size of each component which provides elasticity of the unit may preferably optimized according to each material for forming the components. With respect to the optical contact unit formed by a method of the present invention, such an optimization of each size may not require so many amounts of trial and error.

Modified Embodiment 2

The taper part (including the taper part 141t and the taper part 131t), which functions to match inside diameter of the first small diameter part 131 and outside diameter of the large diameter part 141 temporally, may be formed either at the main body 130 or at the cable adaptor 140. As a result, a certain or more actions and effects of the present invention can be also obtained.

Modified Embodiment 3

With respect to the slits S1–S4, a certain or more effect may be obtained by forming only one of them. At that time, actions and effects of the present invention can also be obtained. The end point S1a may be formed on the first small diameter part 131 in order to obtain certain or more actions and effects of the present invention.

Modified Embodiment 4

In the first embodiment, the coil spring 120 formed in a helical spring shape is used to construct an elastic member. The elastic member which is useful and can be comprised in the optical contact unit of the present invention, however, is not limited to such a coil spring. As an elastic member, for example, an appropriate resin or synthetic rubber in an approximately tube shape can be employed. When the elastic member is formed by using a resin tube, for example, elasticity in the optical direction can be optimized by controlling thickness of the tube, number of holes formed at the sidewall of the tube, and size of those holes.

Modified Embodiment 5

In the embodiment 1, the large diameter part 141 and the second contact plane 141a are formed by forming the groove 146. Alternately, a cable adaptor without a groove such as the groove 146 can be obtained. For example, width of the groove 146 is largely expanded to backward and the back plane of the groove 146, which is perpendicular to the inner surface 140a, is shifted to the position where the back surface 145 of the maximum external surface 148 exists, the groove 146 is actually removed (vanished??) with the maximum external surface 148. At that time, however, the second contact plane 141a may remain. Accordingly, objected contact structure may be realized by the second contact plane 141a. At that time, a convex part is formed at the external surface of the cable adaptor 140, and the convex part tends to be considered to construct the large diameter part 141. When the large diameter part 141 is formed by using the convex part, separation of the first contact plane 131a and the second contact plane 141a can be sufficiently prevented by employing a process such as adding other contact structure.

In short, the groove 146 in the first embodiment is not an essential element for the optical contact unit of the present invention. A cable adaptor without the groove can provide actions and effects of the present invention.

Modified Embodiment 6

Alternatively, each of the ferrule holder 110, the main body 130, and the cable adaptor 140 is not necessarily a complete rotator. In the first embodiment, rotational asymmetric structure such as slit, which is comparatively difficult to form, is formed mainly at the main body 130 because the main body 130 is made of resin. Alternatively, rotational asymmetric structure such as slit can be formed at other part such as the ferrule holder 110 and the cable adaptor 140. This structure may be arbitral and the ferrule holder 110 and the cable adaptor 140 are not necessarily limited to a rotator.

Modified Embodiment 7

Also, as in the first embodiment, the large diameter part 141 of the cable adaptor 140 may be formed at, for example, around the circuit in circumferential direction of the external surface of the cable adaptor 140. Then, the first small diameter part 131 of the main body 130 may not be necessarily formed around the circuit in circumferential direction. As a result, the first small diameter part in circumferential direction can be formed at an arbitral position. In short, according to the eighth aspect of the present invention, the first small diameter part 131 may be formed at two positions or only one position on the corresponding circuit around the rear opening part 133 of the main body 130. For example, when a region for forming the first small diameter part 131 of the main body 130 in circumferential direction is small, it becomes easier to modify a circular region (existing around the rear opening part 133) of the main body 130 comprising the first small diameter 13. As a result, inserting the cable adaptor 140 into the main body 130 tends to become easier.

Alternatively, when the region for forming the first small diameter part 131 in circumferential direction is small, width of the slit S1 can be formed larger.

Further, according to the eighth aspect of the present invention, when the first small diameter part is formed partially in circumferential direction, the large diameter part 141 of the cable adaptor 140 is formed around the circuit in circumferential direction of the external surface of the cable adaptor 140. Accordingly, after the unit is composed, the first contact plane may always contact to the second contact plane 141a even when the main body 130 and the cable adaptor 140 are relatively rotated around the axis. Accordingly, the cable adaptor 140 can hardly be pulled out and loosen from the main body 130.

Modified Embodiment 8

In the first embodiment of the present invention, the ferrule holder 110 is inserted to the main body 130 from the rear opening part 133. However, the first embodiment of the present invention is not limited thereto and can be applied widely. For example, the first embodiment can be applied to the conventional unit in which a ferrule holder is inserted (or enforced to penetrate) from the front opening part of the main body. At that time, actions and effects of the present invention can also be obtained.

Alternatively, magnitude of each diameter of the junction parts of the main body 130 and the cable adaptor 140, or relation between embracing and injecting, can be reversed. Even when the junction relationship between the main body 130 and the cable adaptor 140 is reversed, an objected contact structure, which never allows the cable adaptor 140 from being loosen from the main body 130.

INDUSTRIAL AVAILABLENESS

The present invention discloses mechanical structure of an optical plug and a junction member which couples optical fibers. So the optical plug and the optical contact unit of the present invention is useful for a cable connector (coupler) having an optical fiber. With respect to the optical plug which uses the optical contact unit of the present invention, regardless of whether it is male or female and whether it has a dividing sleeve or not, and with respect to the optical plug which only uses the optical contact unit of the present invention to either male part or female part, actions and effects of the present invention can be obtained.

The optical contact unit of the present invention can be applied to, for example, an optical plug for the input and output unit of an optical device such as image data output part of a TV camera and an optical plug which inputs and outputs optical data and is incorporated or fixed at the wall, floor, or ceiling of a house.

While the present invention has been described with reference to the above embodiments as the most practical and optimum ones, the present invention is not limited thereto, but may be modified as appropriate without departing from the spirit of the invention.

The present invention comprises all the contents in the priority claiming Japanese patent application No. 2004-120751.

The invention claimed is:

1. An optical contact unit which constructs an elastic contact at which a ferrule A connected to a back end part of an optical fiber is faced and mechanically couples on another ferrule B placed at a front side of the ferrule A, comprising:
    said ferrule A;
    a tubular main body at least comprising:
        a ferrule holder which holds said ferrule A and the back end part to which said optical fiber of said ferrule A is connected; and
        an elastic member which gives said ferrule holder elasticity to translate in an optical axis direction of said optical fiber and holds said ferrule holder; and
    a tubular cable adaptor which is inserted to a back opening part of said main body and is penetrated by said optical fiber,
    wherein said main body comprises a first small diameter part which has a first contact plane extending approximately vertical from an internal surface of said main body toward an inside of said main body,
    wherein said cable adaptor comprises a large diameter part which has a second contact plane extending approximately vertical from the external surface of said cable adaptor toward an outside of said cable adaptor,
    wherein a maximum radius of said large diameter part is larger than a minimum radius of said first small diameter part,
    wherein said large diameter part is installed at a front side of said first small diameter part,
    wherein said second contact plane contacts to said first contact plane, and
    wherein said main body comprises:
        a slit which penetrates from the front opening part of said main body in the optical axis direction; and a concave part which fits with the rear edge part of a dividing sleeve unit comprising and keeping a dividing sleeve and is formed in the internal surface of the front opening part.

2. The optical contact unit according to claim 1, wherein said main body comprises a second small diameter part having a third contact plane, which extends from the internal surface around a front opening part of said main body to inside in approximately vertical direction, wherein a maximum radius of said ferrule holder is smaller than the minimum radius of said first small diameter part and larger than a minimum radius of said second diameter part, and wherein an edge of the front opening part of said ferrule holder contacts to the third contact plane.

3. The optical contact unit according to claim 1, wherein a taper part which helps to insert said cable adaptor into said main body is formed at a forward part of said large diameter part of said cable adaptor.

4. The optical contact unit according to claim 1, wherein said main body comprises said taper part which helps to insert said cable adaptor at a back side of said first small diameter part.

5. The optical contact unit according to claim 1, wherein a slit which penetrates from the back opening part in the optical axis direction is formed at said main body, and wherein said slit reaches deeper in a forward direction into said main body than said first small diameter part.

6. The optical contact unit according to claim 1, wherein said elastic member is formed by using a metal coil spring.

7. The optical contact unit according to claim 1, wherein said external surface of said cable adaptor is formed in an approximately rotator shape whose rotational axis is in said optical axis direction, and wherein said large diameter part has a substantially circular shape in a circumferential direction around said external surface.

8. An optical plug which functions to face and connect forward facets of two ferrules, comprising an optical contact unit according to claim 1.

9. An optical contact unit which constructs an elastic contact at which a ferrule A connected to a back end part of an optical fiber is faced and mechanically couples on another ferrule B placed at a front side of the ferrule A, comprising:

said ferrule A;

a tubular main body at least comprising:
   a ferrule holder which holds said ferrule A and the back end part to which said optical fiber of said ferrule A is connected; and
   an elastic member which gives said ferrule holder elasticity to translate in an optical axis direction of said optical fiber and holds said ferrule holder; and a tubular cable adaptor which is inserted to a back opening part of said main body and is penetrated by said optical fiber, wherein said main body comprises a first small diameter part which has a first contact plane extending approximately vertical from an internal surface of said main body toward an inside of said main body, wherein said cable adaptor comprises a large diameter part which has a second contact plane extending approximately vertical from the external surface of said cable adaptor toward an outside of said cable adaptor, wherein a maximum radius of said large diameter part is larger than a minimum radius of said first small diameter part, wherein said large diameter part is installed at a front side of said first small diameter part, wherein said second contact plane contacts to said first contact plane, wherein a through-type hole, which is formed at a supporting member which supports said cable adaptor and has an axis approximately corresponding to that of said cable adaptor, comprises at least a portion of said cable adaptor, wherein a rotational asymmetric part, which is asymmetric to a rotation around an axis of said cable adaptor, is formed at said external surface of said cable adaptor, wherein a rotation preventing part contacts a rotational preventing part which is formed at the internal surface of said through-type hole, and wherein said rotational asymmetric part is formed by at least two planes which are approximately parallel with each other and sandwiching the axis of said cable adaptor.

* * * * *